D. W. REESE.
VISE.
APPLICATION FILED AUG. 21, 1918.
1,302,220.
Patented Apr. 29, 1919.
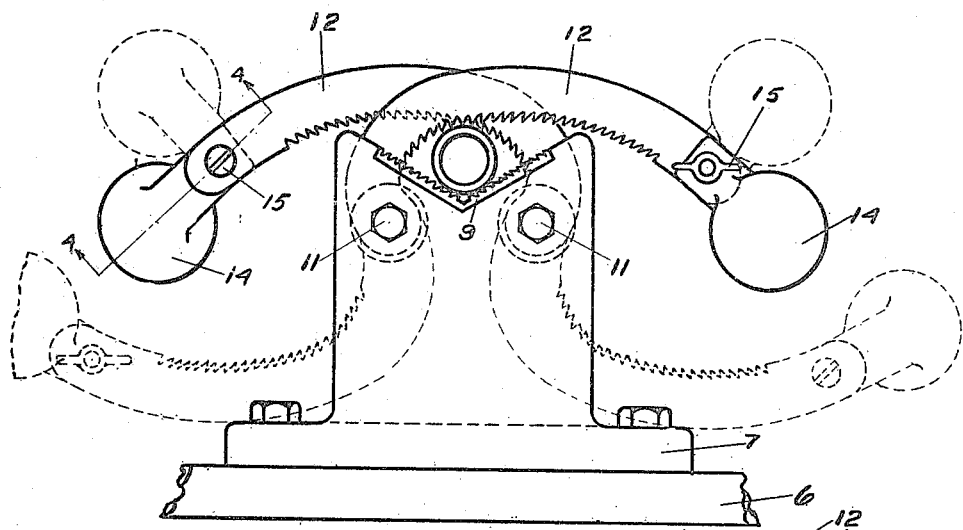
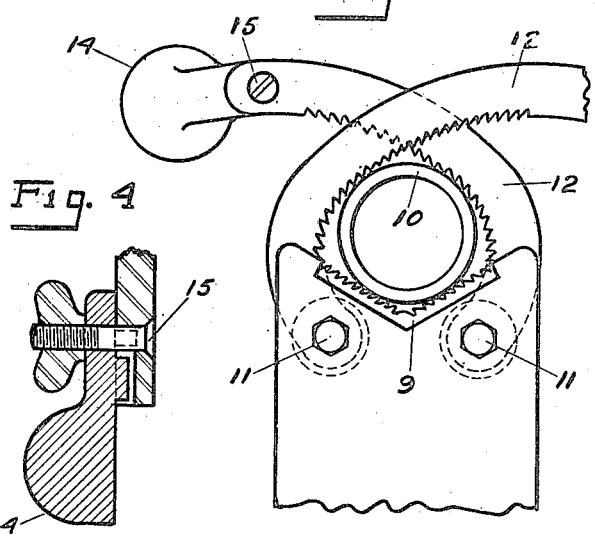
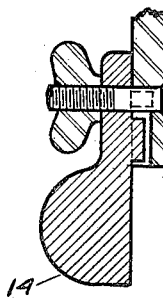
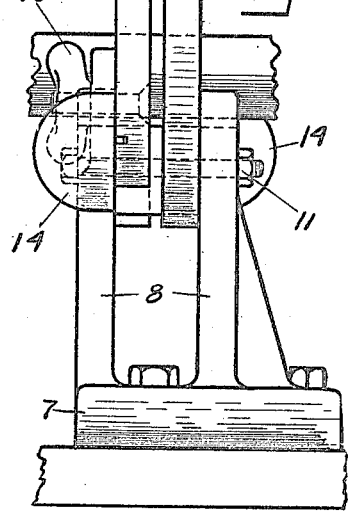
INVENTOR
D. W. Reese
By John A. Bommhass
ATTORNEY

UNITED STATES PATENT OFFICE.

DAVID W. REESE, OF EAST CLEVELAND, OHIO, ASSIGNOR TO JOHN HOEHN AND MARTHA HOEHN, BOTH OF EAST CLEVELAND, OHIO.

VISE.

1,302,220. Specification of Letters Patent. Patented Apr. 29, 1919.

Application filed August 21, 1918. Serial No. 250,768.

*To all whom it may concern:*

Be it known that I, DAVID W. REESE, a citizen of the United States, residing at East Cleveland, in the county of Cuyahoga and State of Ohio, have invented certain new and useful Improvements in Vises, of which the following is a specification.

This invention relates to vises for pipes or other round work, and is particularly an improvement on the pipe vise shown in my U. S. Patent No. 1108519, dated August 25, 1914.

One object of the present improvement is to provide a device comprising a base having two pivoting jaws mounted thereon, the jaws being so constructed that they will grip pipes of different sizes, being in this respect superior to the vise shown in said patent.

Another object of the present invention is to provide adjustable weights on the ends of the jaws, which will adapt the jaws for a wider range of use with respect to the size of the work, than the patented vise referred to.

Other improved details will appear from the following description and the accompanying drawings, in which Figure 1 is an end elevation of the vise. Fig. 2 is a side elevation thereof. Fig. 3 is a detail in end elevation showing the vise applied to large work. Fig. 4 is a detail in section of one of the adjustable weights.

Referring to the drawings, 6 indicates the bench or support to which the base plate 7 is bolted and this base plate is provided with a pair of upright seat members 8, the upper ends of which are V-shaped and provided with serrated face plates 9 the teeth of which are oppositely presented to grip both ways, the pipe 10 resting on said face plates.

To each upright member is pivoted at 11 a pair of arcuate jaws 12 having oppositely presented teeth 13. To enable these jaws to grip pipes of different sizes, the curvature of the engaging faces thereof is such that in all positions of the jaws, they will contact tangentially with the surface of the work, whether large or small, the degree of curvature being less than that shown in said patent. That is, instead of a curve of small radius at the inner ends of the jaws, as in the patent, the curve in the present invention is of larger radius, so that even with small work the present jaws will rest on the work at a proper angle to grip the same. To give the most efficient gripping action the amount of pressure of the jaws against the work should differ or vary according to the diameter of the work, and, therefore, at the outer end of each jaw, I provide an adjustable weight 14 connected to the jaw by a pivot thumb screw 15, by means of which the weight can be set nearer or farther from the fulcrum of the jaw, and so vary the effective pressure. The weights are adjusted by swinging the same on the pivots 15 as indicated in dotted lines in Fig. 1. The weights should be adjusted inwardly for work of small diameter and outwardly for work of large diameter.

In use, the work is laid across the seat members and the swinging jaws are dropped to contact therewith, the teeth engaging the work will hold the same.

I claim:

A vise comprising a base provided with upright seat members, swinging jaws pivoted to the members and adapted to grip the work thereon, and weights pivoted to the outer ends of the swinging jaws, for adjustment thereon.

In testimony whereof, I do affix my signature in presence of two witnesses.

DAVID W. REESE.

Witnesses:
 JOHN A. BOMMHARDT,
 G. W. ROSENBERG.

Copies of this patent may be obtained for five cents each, by addressing the "Commissioner of Patents, Washington, D. C."